(12) United States Patent
Erickson

(10) Patent No.: US 6,520,490 B1
(45) Date of Patent: Feb. 18, 2003

(54) LIQUID COMPOST AERATOR AND METHOD OF USING SAME

(75) Inventor: Jerry Erickson, Bainbridge Island, WA (US)

(73) Assignee: Soilsoup Inc., Shoreline, WA (US)

( * ) Notice: Subject to any disclaimer, the term of this patent is extended or adjusted under 35 U.S.C. 154(b) by 0 days.

(21) Appl. No.: 09/405,288

(22) Filed: Sep. 23, 1999

(51) Int. Cl.⁷ .................................................. B01F 3/04
(52) U.S. Cl. .......................................... 261/93; 261/91
(58) Field of Search .............................. 261/84, 91, 93

(56) References Cited

U.S. PATENT DOCUMENTS

| | | | | |
|---|---|---|---|---|
| 2,170,496 A | * | 8/1939 | Gard et al. | 261/93 |
| 2,244,902 A | * | 6/1941 | Stich | 261/93 |
| 2,308,751 A | * | 1/1943 | Guthrie et al. | 261/93 |
| 2,612,358 A | * | 9/1952 | Daman | 261/93 |
| 3,278,170 A | | 10/1966 | Moritz | |
| 3,778,233 A | | 12/1973 | Blough et al. | |
| 3,782,702 A | | 1/1974 | King | |
| 3,796,417 A | | 3/1974 | Kaelin | |
| 3,827,679 A | | 8/1974 | Kaelin | |
| 4,240,990 A | | 12/1980 | Inhofer et al. | |
| 4,265,739 A | | 5/1981 | Dalton | |
| 4,305,894 A | * | 12/1981 | Lindblom | 261/93 |
| 4,313,898 A | | 2/1982 | Schurch | |
| 4,341,641 A | | 7/1982 | Novak | |
| 5,085,809 A | * | 2/1992 | Stirling | 261/93 |
| 5,194,144 A | | 3/1993 | Blough | |
| 5,314,076 A | * | 5/1994 | La Place et al. | 261/93 |
| 5,925,290 A | * | 7/1999 | Hills | 261/93 |
| 5,988,600 A | * | 11/1999 | Vento | 261/93 |

OTHER PUBLICATIONS

Brochure by Aeration Industries International, Inc . . . entitled *Aire–O₂ Aspirator Aerator*, Date Unknown.

* cited by examiner

*Primary Examiner*—C. Scott Bushey
(74) *Attorney, Agent, or Firm*—John Russell Uren

(57) ABSTRACT

A compost aerator for aerating a compost/liquid mixture. The aerator has a aerator pump located downstream from a liquid inlet. The aerator pump has a plurality of impellers mounted on a rotor which spins within a circular channel though which the liquid flows. The liquid is propelled through the channel by the impellers and, as the area of the channel decreases downstream from the impellers caused by the increase in diameter of the rotor, the velocity of the liquid increases. Air enters the channel upstream from the impellers and is drawn with the liquid through the channel. The diameter of the rotor then decreases significantly thereby causing the area of the liquid carrying channel to increase suddenly downstream of the widest portion of the rotor. Turbulence occurs in this area and bubbles are formed which are released from the outlet of the compost aerator into the compost/liquid mixture to perform aeration for bacterial breakdown.

7 Claims, 8 Drawing Sheets

LIQUID COMPOST AERATOR AND METHOD OF USING SAME

INTRODUCTION

This invention relates to a liquid compost aerator and, more particularly, to a liquid compost aerator utilising a vortex generator to create small bubbles used in the aerating action and to the method used in operating the vortex generator for aerobic bacterial breakdown.

BACKGROUND OF THE INVENTION

The use of bubbles for assisting in the aeration of a liquid compost waste solution is well known. Such a process used in the liquid composting process is called aerobic, and utilises oxygen in breaking down sewage and like materials. This is as opposed to the non-oxygen or anaerobic process of bacterial breakdown. The use of aeration in bacterial breakdown enhances the breakdown action and has other advantages. Following the bacterial breakdown of the waste material into components, some of such components may be used as fertilizer which otherwise can be expensive. Thus, bacterial breakdown of waste materials can be attractive.

The aeration action using bubbles typically uses a bubble generator. Water or other liquid is mixed with the compost and bubbles are generated beneath the surface of the liquid. These bubbles rise to the surface and, in doing so, distribute air within the compost-liquid mix. The air aerates the mix and assists in the bacterial breakdown.

U.S. Pat. No. 3,778,233 (Blough et al), for example, discloses an elongated hollow shaft with a propeller secured to one end, which propeller is immersed in the liquid waste material. The operation of the propeller induces bubbles and movement within the waste material which enhances the aerobic process. A further example of a propeller system is described and illustrated in U.S. Pat. No. 4,240,990 (Inhofer et al).

The bubbles generated by the apparatuses of the above-identified and other known prior art are generated by propeller action. That is, propellers are immersed in the compost-liquid mix and revolved, often at relatively high speeds. The revolving action of the propellers causes turbulence within the mixture and the concomitant generation of bubbles. The bubbles assist in dispersing oxygen throughout the mixture which, as discussed, enhances the efficacy of the aeration action in breaking down the compost.

It is important in the aeration action to generate bubbles that are relatively small. The smaller the bubbles, the more numerous they will be and the total surface area of the air bubbles will be greater. The greater surface area of the bubbles will result in more air being dispersed throughout the compost/liquid mix. The smaller bubbles will rise more slowly to the surface and will therefore be dispersed more uniformly throughout the mix and over a greater area.

Propellers generate bubbles that are relatively large, even at high speeds of revolution. And, of course, the relatively large diameter of the propellers used for bubble generation does limit the speed of rotation. While the relatively large bubbles do cause aerobic action, the bubbles rise to the surface quickly and are not, therefore, dispersed widely throughout the compost/liquid mixture.

SUMMARY OF THE INVENTION

According to one aspect of the invention, there is provided air entrainment apparatus to entrain air in liquid comprising a liquid inlet for supplying liquid to a liquid conveying channel, an air inlet to allow the entry of air to said liquid conveying channel, said air being introduced into said liquid in said liquid conveying channel and a vortex generator downstream from said point of introduction of said air and said liquid to said liquid conveying channel, said vortex generator being operable to cause turbulence in said liquid conveying channel and to create bubbles in said liquid, said liquid forming an annular portion within said liquid conveying channel adjacent to said vortex generator.

According to a further aspect of the invention, there is disclosed a method of creating turbulence in a liquid/air mixture for aerobic bacteria breakdown comprising the steps of conveying liquid through a liquid carrying channel, allowing air to enter said liquid in said liquid carrying channel from an air inlet, reducing the cross-sectional area of said liquid carrying channel by positioning a vortex generator having a skirt with a diameter increasing from an upstream to a downstream position and allowing said liquid carrying channel to increase in cross-sectional area immediately downstream of the widest diameter of said skirt of said vortex generator.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
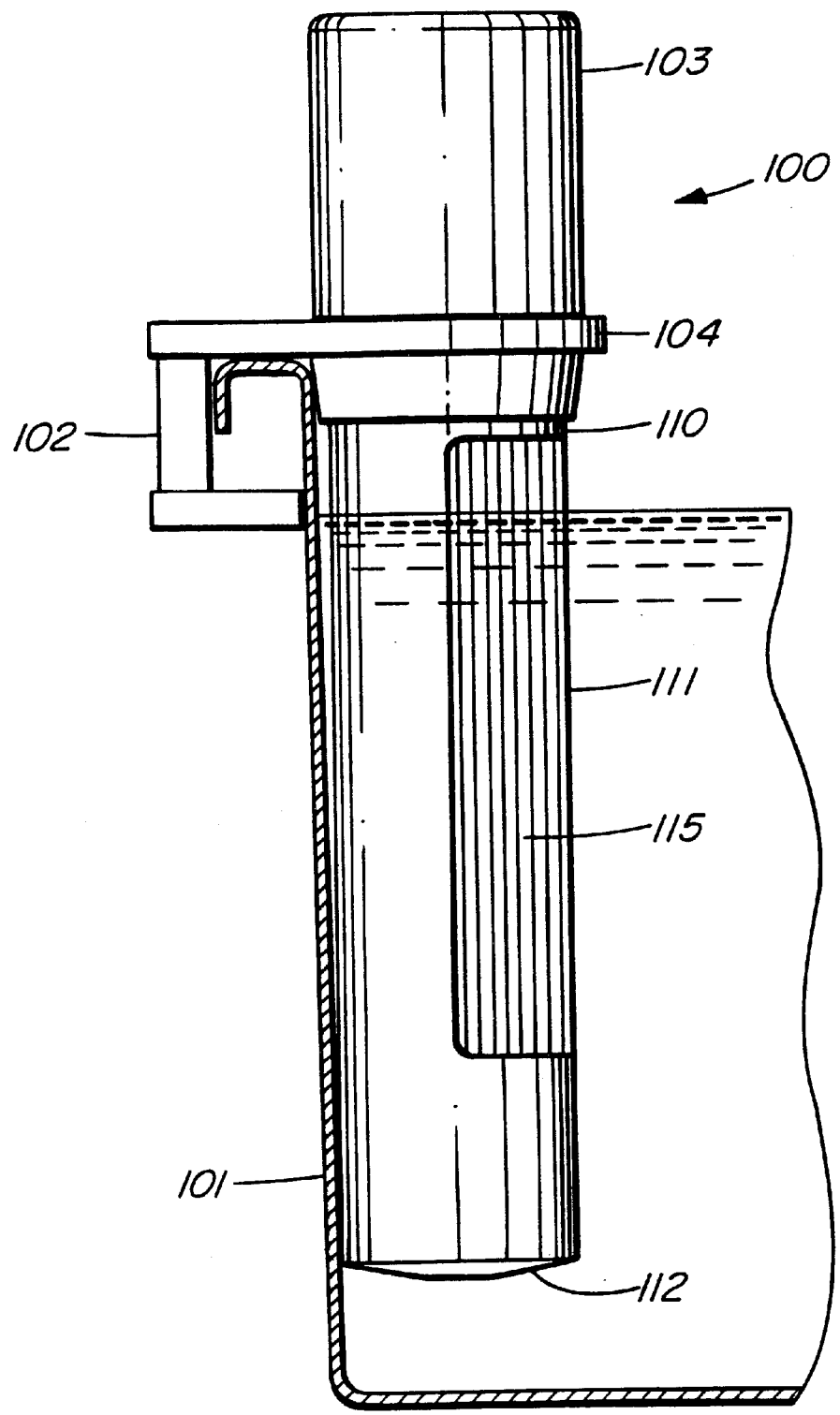
FIG. 1 is a diagrammatic side view of the liquid compost aerator according to one aspect of the present invention, such aerator being in its operating position within a container holding the liquid/compost mixture which is intended to be aerated.

Referring now to the drawings, a liquid compost aerator according to one aspect of the invention is illustrated generally at 100 in FIG. 1. The aerator 100 is removably connected to a container 101 with a clamp 102. Container 101 holds the compost material and liquid sought to be aerated by the compost aerator 100. Container 101 may be any suitable size but containers of from five (5) gallons or larger are envisioned.

A motor 103 is mounted in the upper area of the compost aerator 100 to a collar 104 and clamp 102 is connected to collar 104. A casing 110 is mounted below collar 104 and encloses the aerator components within the casing 110, such components to be described. Casing 110 has a circumferential opening 111 which allows liquid within container 101 to enter the compost aerator 100. A mesh 115 is suitably positioned to be concentric to circumferential opening 111. Mesh 115 has openings to allow the ingress of liquid to the inside of the compost aerator 100 from container 101 but which prevents larger debris from entering the aerator 100. Casing 110 also contains a bottom opening 112. Bottom opening 112 allows the air/liquid mixture with the generated bubbles from the aerator pump generally illustrated at 113 (FIG. 2) to exit from the casing 110 as will be described.

Figure 2:
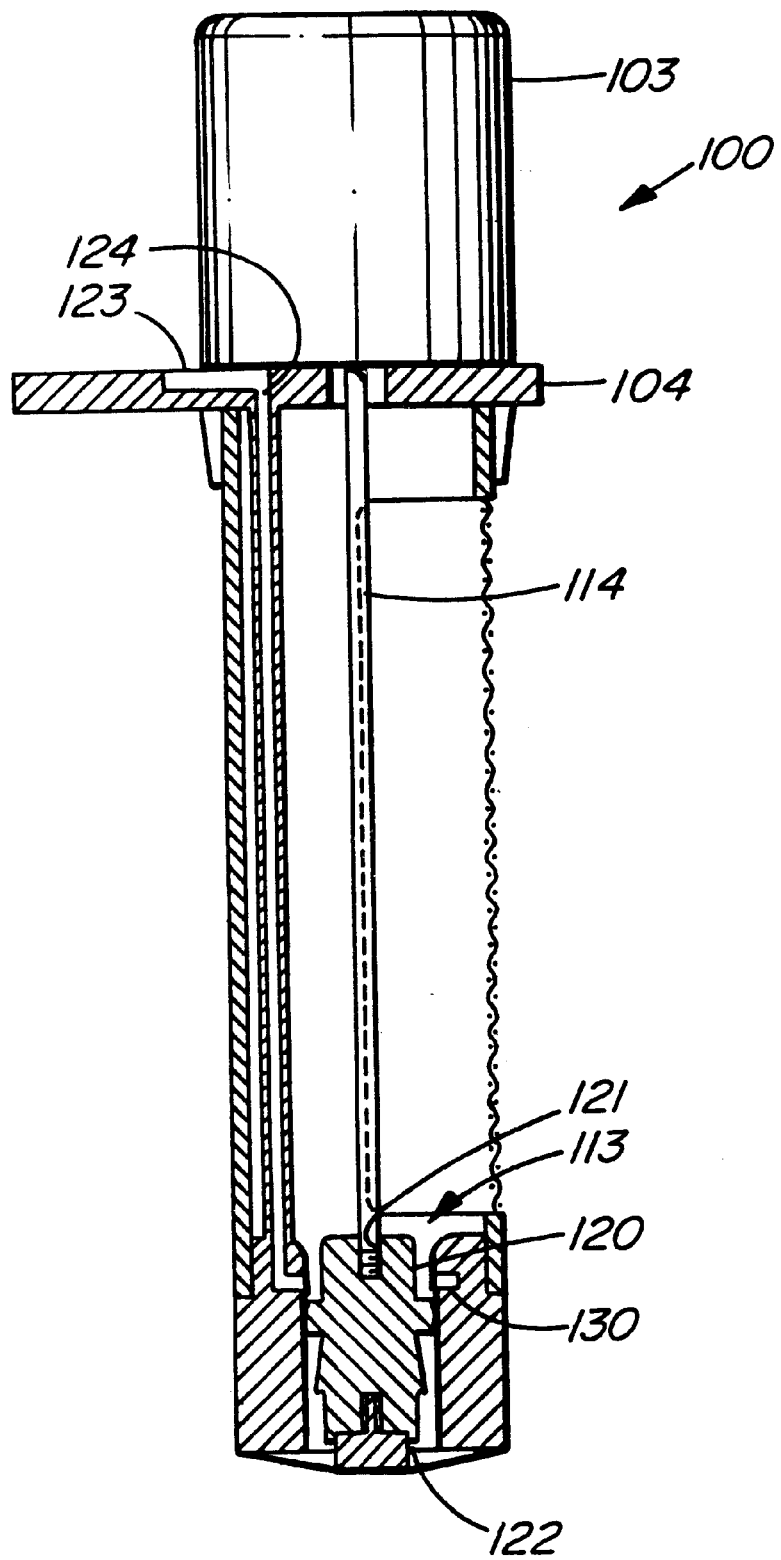
FIG. 2 is a diagrammatic side sectional view of the liquid compost aerator of FIG. 1 without the aerator housing cover thereby illustrating the inside components of the aerator.

Referring now to FIG. 2, the motor 103 has an attached shaft 114 which is rotated by the rotor 103 when the motor 103 is under operation. Shaft 114 is longitudinal and is connected at its distant end to the upper end of a rotor 120, conveniently by the use of a threaded connection 121. The bottom of rotor 120 is mounted on a stationary bearing 122 so as the shaft 114 rotates, rotor 120 similarly rotates on bearing 122.

An air inlet 123 is provided in collar 104 and an air passageway 124 extends from the air inlet 123 downwardly to the aerator pump 113. Air enters the aerator pump 113 from a circumferential passageway or plenum 130 communicating with air passageway 124 as will be described.

Figure 3:
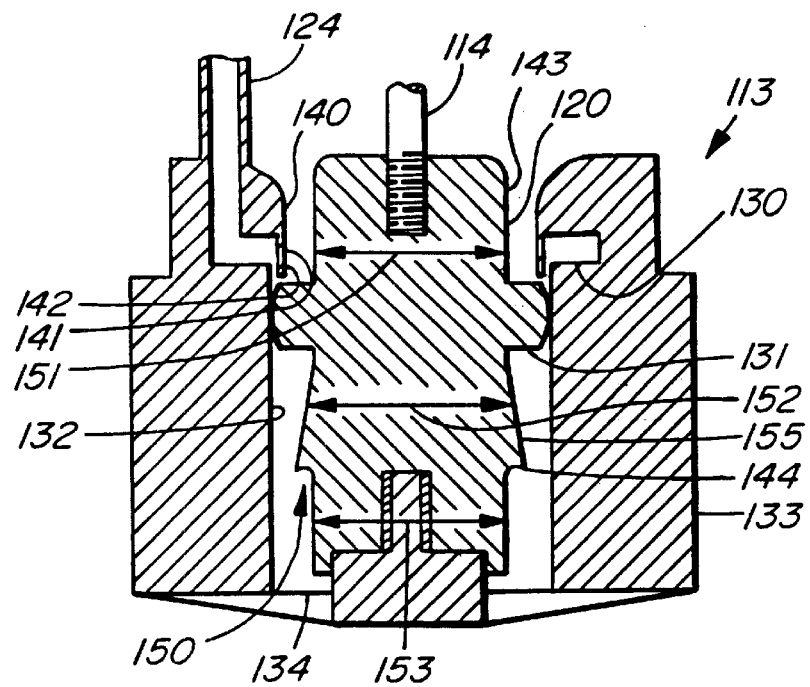
FIG. 3 is an enlarged diagrammatic sectional side view of the components of the aerator pump located in the lower area of the liquid compost aerator.

Reference is now made to FIG. 3 wherein the aerator pump 113 is illustrated in greater detail. A plurality of impeller blades 131 is attached to rotor 120 and rotates with rotor 120 when the shaft 114 is rotated by motor 103.

Rotor 120 rotates within a circular opening 132 machined within a block of material 133, conveniently a non-corrosive stainless steel, plastic material or the like. The air plenum 130 is likewise machined within block 133 and connects with the air passageway 124. The diameter of the circular opening 132 in the lower area of block 133 is constant and slightly larger than the outside diameter of the tips of the impeller blades 131 in the area from the bottom of air plenum 13 to the outlet opening 134.

Upstream of the impeller blades 131, a circular opening 140 having a slightly smaller diameter than the diameter of circular opening 132 is formed. This opening 140 extends downwardly and slightly overlaps with the commencement of circular opening 132. The bottom thereby forms a skirt 141 over air plenum 130 leaving a narrow circular slit 142 which allows the air in air plenum 130 to be released along the outside diameter of circular opening 132 slightly upstream of the impeller blades 131.

Figure 10:
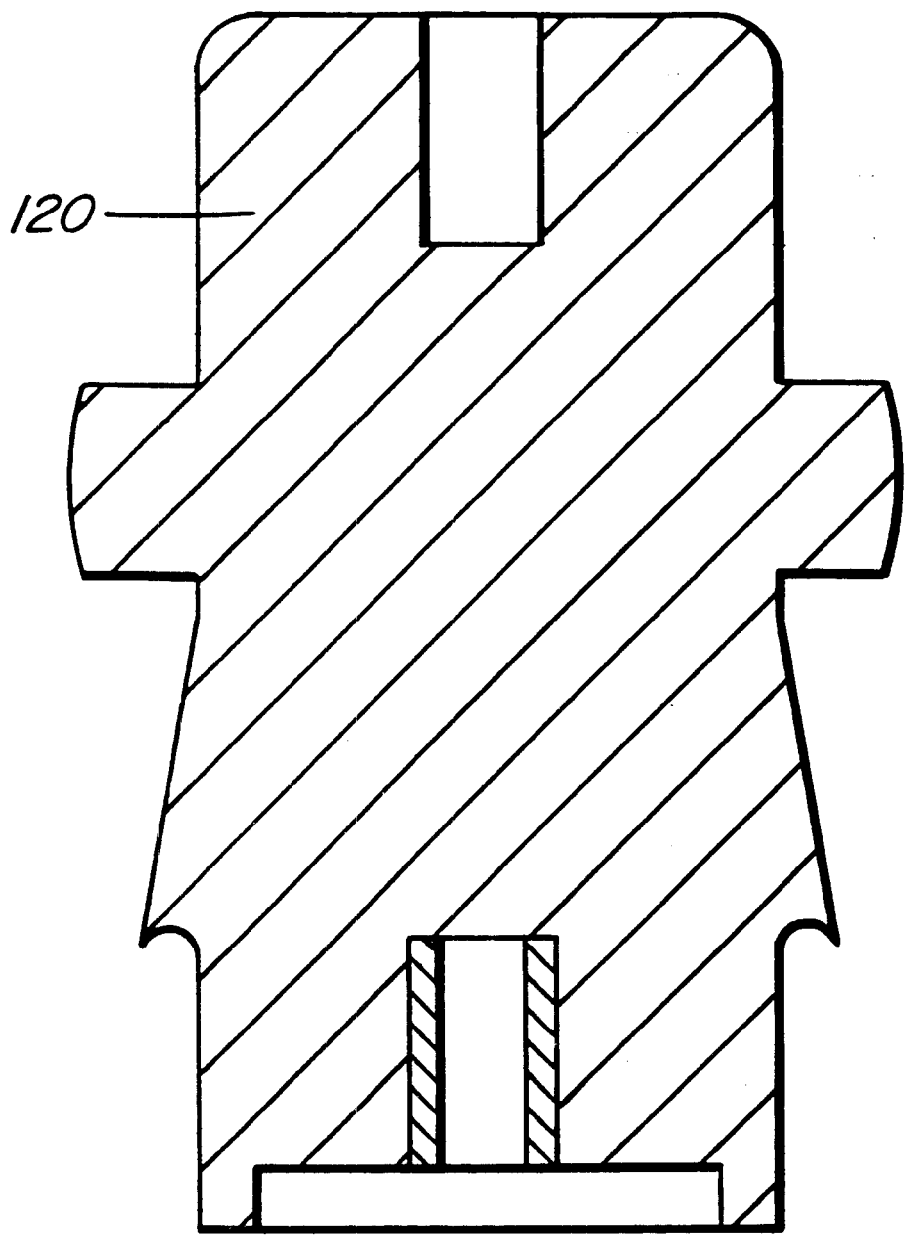
FIG. 10 is an enlarged diagrammatic detail side view of the vortex generator with specific dimensions shown thereon in an illustrative embodiment.

The shape of rotor 120 contributes to the formation of the aerated bubbles and will be discussed in detail. Beginning at the upper end 143 of rotor 120, the uppermost diameter 151 of the rotor 120 is constant and extends downwardly until the area of attachment of the impeller blades 131 is reached. This intermediate diameter 152 then increases by a relatively constant amount in a skirt type configuration until the lowermost portion, edge or tip 144 of the increased diameter is reached. This lowermost portion or tip 144 is a sharp edge and defines the outer and widest diameter of the vortex generator generally illustrated at 150. A radius extends from the tip 144 inwardly where it smoothly joins with a lower diameter 153 having approximately the same dimension as the upper diameter 151. A typical embodiment for a rotor 120 with specific dimensions shown for reference purposes is illustrated in the detail of FIG. 10.

OPERATION

In operation, the compost aerator 100 is positioned within the container 101 as viewed in FIG. 1 and the clamp 102 is securely tightened to maintain the aerator 100 in position during operation. The motor 103 is then switched on and as it commences to turn shaft 114, rotor 120 will begin to turn within the circular opening 132 of block 133 on bearing 122.

The liquid within the container 101, having entered into the interior of casing 110 through mesh 115, will pass downwardly through the annular channel formed between the outside diameter 151 of rotor 120 and the diameters of circular openings 132 and 140, the velocity of the liquid increasing because of the transporting effect of the impeller blades 131 and the reduction of the area of the annular channel as the intermediate diameter 152 increases downwardly towards the vortex generator 150 from the upstream to the downstream end of the skirt 155.

The air from air plenum 130 is drawn from the plenum 130 by the suction created by the moving liquid and enters the annular channel along the outside diameter of circular opening 132.

The abrupt increase in area of the annular channel downstream of tip or edge 144 creates significant turbulence within the liquid and the air is formed into countless small bubbles which are distributed throughout the liquid from the tip or edge 144 to the outlet opening 134 of the aerator pump 113 where the bubbles are released into the liquid within the container 101. The bubbles, being very small, rise to the surface slowly and are therefore dispersed widely within the container 101. The aeration assists in the aforementioned bacterial breakdown.

Figure 4:
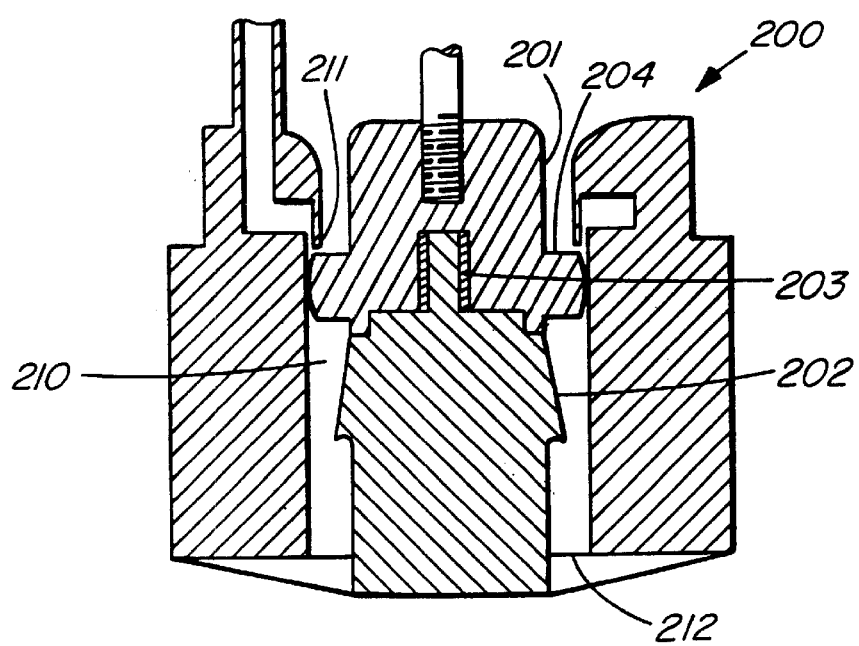
FIG. 4 is an enlarged diagrammatic sectional side view of the components of the aerator pump located in the lower area of the liquid compost aerator according to a further embodiment of the invention.

A further embodiment of the invention is illustrated in FIG. 4. Specifically, the FIG. 4 embodiment of the aerator pump 200 is illustrated with the rotor 201 formed in a smaller piece although the effect is similar to the effect of the aerator pump 113 of FIG. 3.

In the FIG. 4 embodiment, the vortex generator 202 does not rotate with the rotor 201 but, rather, it remains stationary and acts as a mount for bearing 203. During operation, the liquid again flows by the impeller blades 204 through annular channel 210 and the air is similar released from circular slit 211. The action of the vortex generator 202 is precisely the same as the action with the vortex generator 150 of the first embodiment; that is, the liquid and entrained air will suddenly expand immediately downstream of the vortex generator 202 with significant turbulence thereby generating the desired bubbles with such bubbles being dispersed from the outlet end 212 of the aerator pump 200.

Figure 5:
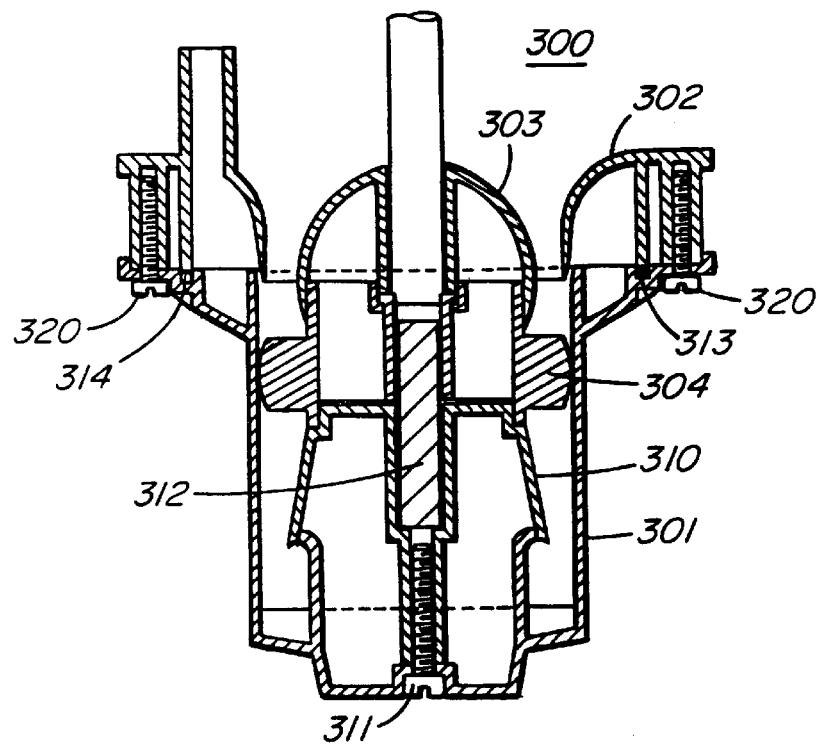
FIG. 5 is an enlarged diagrammatic sectional side view of the assembled individual components of the aerator pump located in the lower area of the liquid compost aerator for manufacturing and assembly purposes.

A convenient construction or assembly of the aerator pump 300 is illustrated in FIG. 5. In this embodiment, the assembly 300 is made primarily from injection molded thermo-plastic material which molding process requires a substantially uniform wall thickness where possible to ensure uniform shrinkage. The molded parts include the pump housing 301, the air inducer and plenum 302, the upper rotor housing and shaft coupling 303, the rotor with the impeller blades 304 and the vortex generator which includes the bearing holder 310.

The FIG. 5 apparatus is intended as a sub-assembly. The sequential assembly would include connecting the pump housing 301 and vortex generator 310 with a screw or bolt 311. The shaft 312 is glued in place using an adhesive, conveniently LOCTITE adhesive. The rotor 304 is then placed on the shaft 312 and an o-ring 313 is placed in groove 314 and the air inducer and plenum 302 is fastened to the pump housing 301 with screws 321, conveniently four (4). Thus, the rotor 304 is captive and the upper rotor housing and shaft housing 302 couples the drive shaft 312 to the rotor 304 by a keyed or splined fit.

Figure 6:
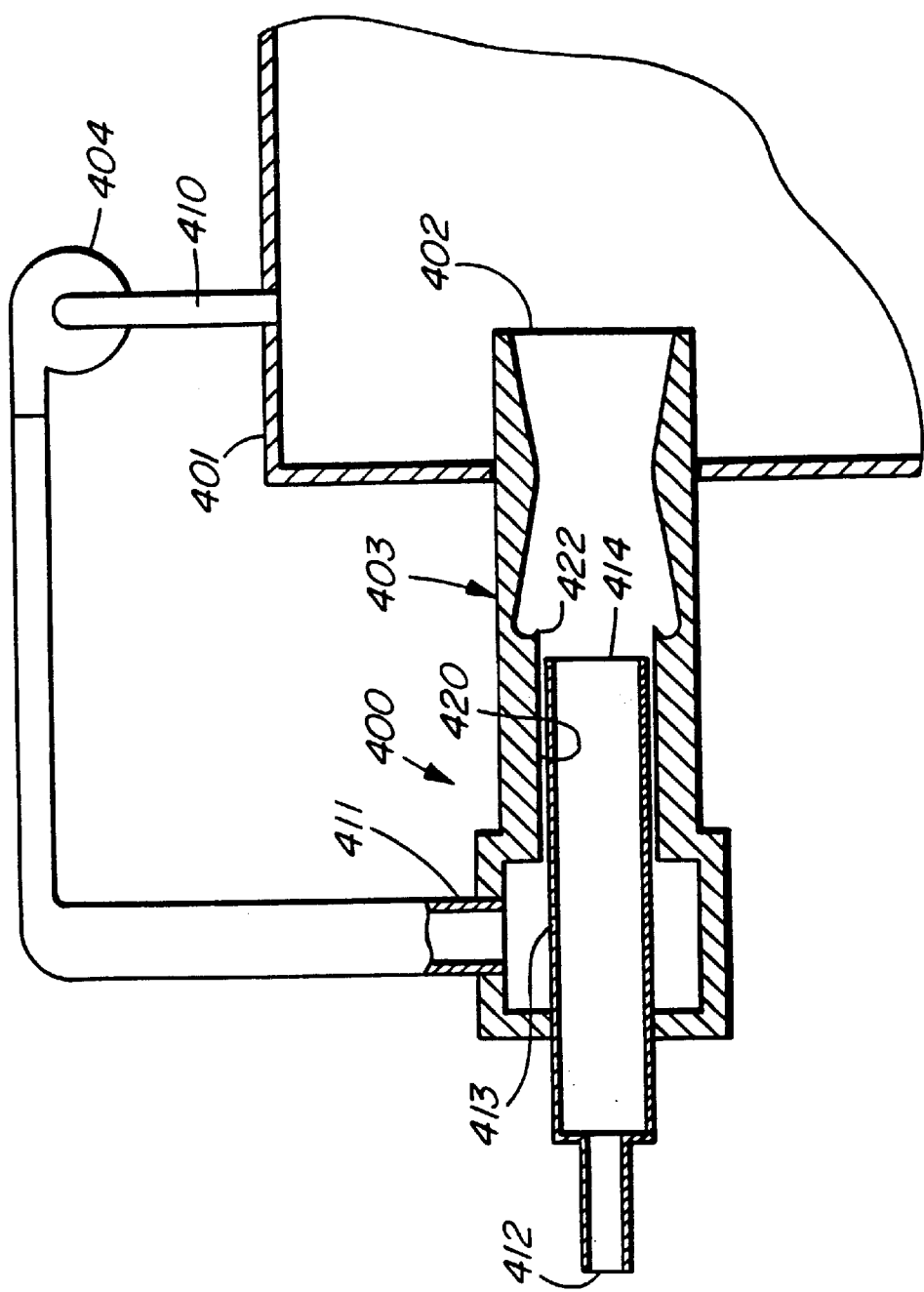
FIG. 6 is an enlarged diagrammatic sectional side view of a liquid compost aerator according to a further aspect of the invention.

Yet a further embodiment of the compost aerator 400 is illustrated in FIG. 6. In this embodiment, the bulk of the compost aerator 400 is not within the container 401. Rather, only the outlet 402 of the aerator pump 403 extends into the container 401. Likewise, the use of impellers to induce flow past the vortex generator is replaced with a pump which likewise induces flow so the impellers are not required. In the FIG. 6 embodiment, the vortex generator 422 does not spin. Such spinning action is not seen as being necessary where liquid flow inducement past the vortex generator is done by an apparatus other than the revolving impellers and rotor of the earlier embodiments. A pump 404 is connected to a first conduit 410 which pumps liquid from container 401 to the liquid inlet 411 of compost aerator 400. Air is brought into the compost aerator 400 from air inlet 412 and the air is entrained with the liquid downstream from the outlet 414 of the air conduit 413 but upstream of the vortex generator or edge 422. The air is released from the air outlet 414 inside the outer diameter of the liquid channel 420. This is dissimilar to the first and second embodiments described earlier where the air is released along the outside of the liquid channel but the turbulence generated in such embodiment is believed to be similar to that generated in the first and second embodiments. The liquid flows through the liquid carrying channel 420 and is adjacent the tip 422 of the vortex generator when the channel 420 expands, in a manner similar to the first and second embodiments.

Figure 7:
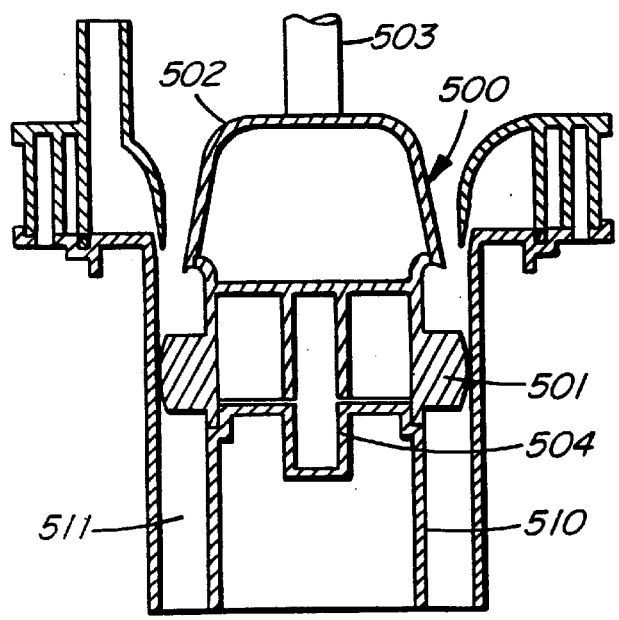
FIG. 7 is an enlarged diagrammatic sectional side view of a liquid compost aerator according to yet a further embodiment of the invention.

FIG. 7 illustrates a further embodiment of the invention. In this embodiment, the vortex generator generally illustrated at 500 is located upstream of the impeller 501. The rotor 502 is rotated by shaft 503 and turns on bearing 504 which is positioned in stationary base piece 510. In operation of the FIG. 7 embodiment, the impeller 501 draws the liquid and entrained air bubbles created by the turbulence adjacent the vortex generator 500 through the channel 511.

Figure 8:
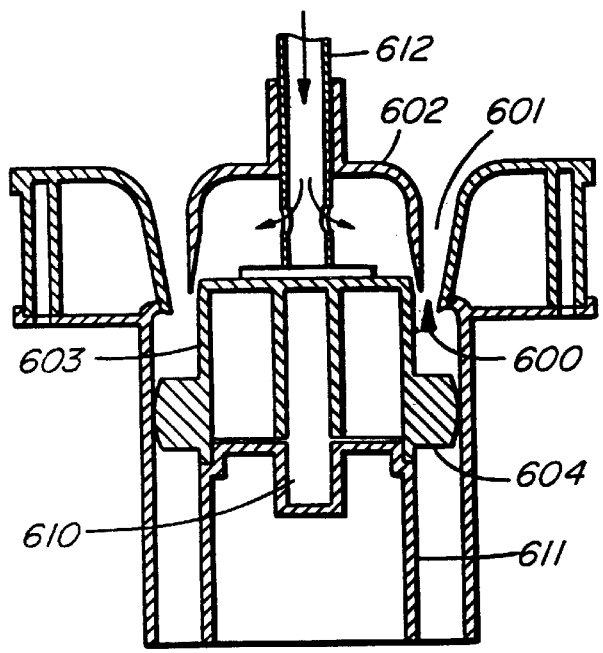
FIG. 8 is an enlarged diagrammatic sectional side view of a liquid compost aerator according to still yet a further embodiment of the invention.

Yet a further Embodiment of the invention is illustrated in FIG. 8. In this embodiment, the vortex generator generally illustrated at 600 is formed in the outer wall of the liquid channel 601 and the housing 602 which allows the egress of air into the liquid channel 601 is rotating and is connected to rotor 603 with its attached impeller blades 604 rotates on bearing 610 on stationary base 611 by way of rotating shaft 612 which also serves as the air conduit into housing 602.

In operation, the impeller blades 604 draw the liquid through the liquid channel 601 and the air is released from housing 602 into the liquid travelling through channel 601. Turbulence around the vortex generator 600 creates the air bubbles which then are emitted from the liquid channel 601 downstream of impeller blades 604.

Figure 9:
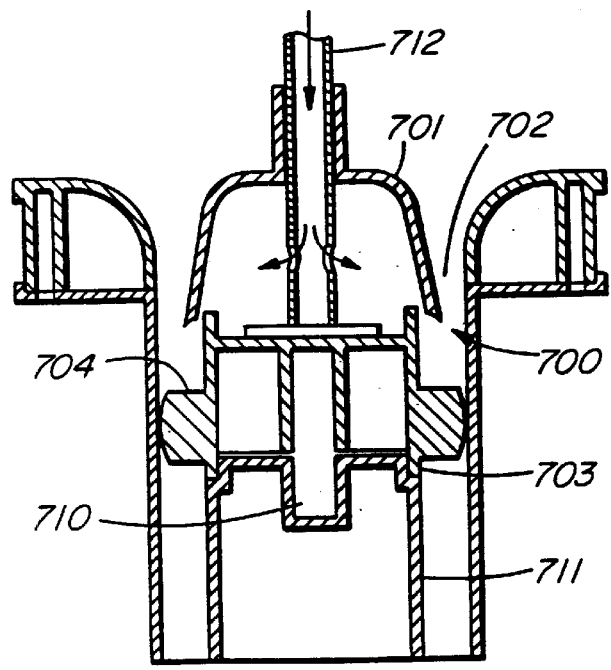
FIG. 9 is an enlarged diagrammatic sectional side view of a liquid compost aerator according to yet a further aspect of the invention.

The embodiment illustrated in FIG. 9 utilises a vortex generator generally illustrated at 700 and wherein the air is released from the housing 701 into the vortex generator 700 precisely where the turbulence is created by the liquid travelling through the liquid channel 702 and with the channel 702 suddenly expanding downstream from the vortex generator 700. The rotor 703 with its attached impeller blades 704 rotates on bearing 710 which is positioned. in stationary base 711 and is connected to the housing 701 which is likewise rotating. The air passes to the housing 701 through the shaft 712 which also rotates rotor 703.

Figure 11:
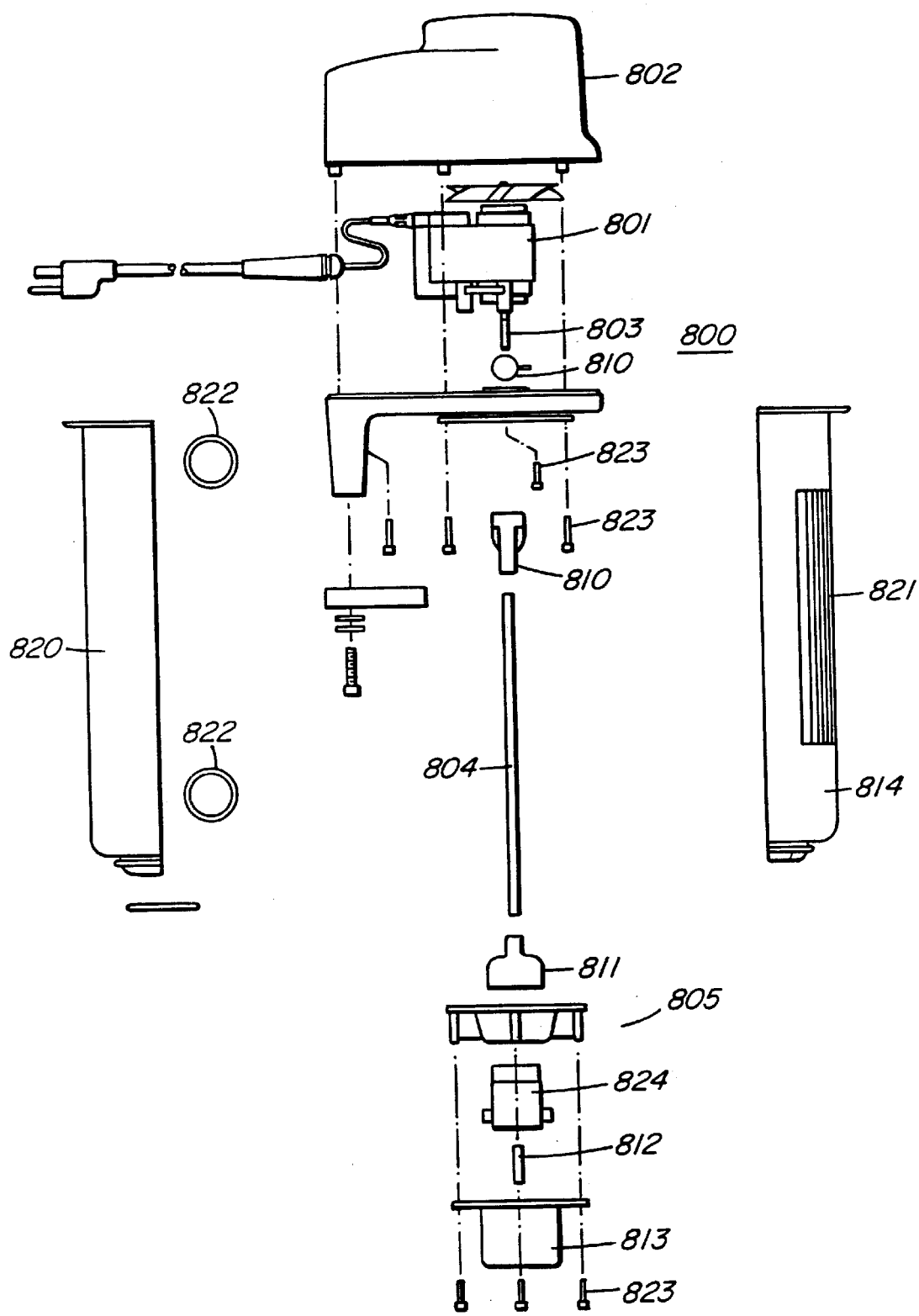
FIG. 11 is a diagrammatic exploded view of the aerator pump particularly illustrating the specific parts of the pump.

FIG. 11 illustrates the specific parts which make up the aerator generally illustrated at 800 with the vortex generator being generally illustrated at 805. An electrical motor 801 is mounted within the motor housing 802 and a drive shaft 803 extends from motor 801. Shaft 804 is hollow and is joined with upper connection 810 (two (2) components) and coupling 811 with adhesive, conveniently LOCTITE (Trademark). Likewise, the bearing 812 on which the rotor 824 rotates is mounted in base 813 similarly using LOCTITE adhesive. The housing comprises two halves 814, 820. Housing half 814 has an inlet 821 to admit the liquid from the compost container and o-rings 822 act as fasteners in connecting the components of the aerator 800 and a plurality of screws 823 is used to secure the components of the aerator 800.

While specific embodiments of the invention have been described, such embodiments should be taken as illustrative of the invention only and not as limiting its scope. Many modifications beyond those specifically described will readily occur to those skilled in the art to which the invention relates and the scope of the invention, therefore, should be defined in accordance with the accompanying claims.

I claim:

1. Air entrainment apparatus to entrain air in an aqueous solution and thereby contribute to aerobic bacterial fermentation, said apparatus comprising an aqueous solution inlet for supplying said aqueous solution to a liquid conveying channel, an air inlet to allow the entry of air to said liquid conveying channel, said air being introduced symmetrically about the axis of said liquid conveying channel and a vortex generator located in said liquid conveying channel downstream from said point of introduction of said air and said aqueous solution to said liquid conveying channel, said vortex generator being defined by a sharp circumferentially extending edge connected to a transition zone in the form of a concave annular surface extending circumferentially about said axis of said liquid conveying channel and exposed to said aqueous solution flowing in said liquid conveying channel, said vortex generator being operable to cause turbulence in said aqueous solution in said liquid conveying channel and to create air bubbles in said aqueous solution.

2. Air entrainment apparatus as in claim 1 wherein said vortex generator includes a skirt, said skirt having an upstream diameter and a downstream diameter, said downstream diameter being wider than said upstream diameter.

3. Air entrainment apparatus as in claim 2 wherein said skirt has a skirt diameter at the most downstream position of said skirt, said skirt diameter being the widest portion of said skirt.

4. Air entrainment apparatus as in claim 3 wherein the area of said liquid carrying channel increases immediately downstream of said skirt diameter.

5. Air entrainment apparatus as in claim 4 and further comprising a rotor, said rotor including a plurality of liquid transporting impellers, said impellers being operable to move said aqueous solution downstream in said liquid carrying channel.

6. Air entrainment apparatus as in claim 5 wherein said vortex generator rotates with said rotor.

7. Air entrainment apparatus as in claim 6 wherein said vortex generator is integral with said rotor.

* * * * *